United States Patent [19]
Gower

[11] 3,768,534

[45] Oct. 30, 1973

[54] SELF-ALIGNING TRACTION ASSEMBLY FOR VEHICLES

[76] Inventor: Roger L. Gower, Room 302, 1911 Jefferson Davis Hwy., Arlington, Va. 22202

[22] Filed: Dec. 30, 1971

[21] Appl. No.: 214,067

[52] U.S. Cl. ............................ 152/239, 152/243
[51] Int. Cl. ............................................. B60c 27/06
[58] Field of Search ............................ 152/239, 243

[56] References Cited
UNITED STATES PATENTS

| 1,872,757 | 8/1932 | Labbe | 152/239 |
| 1,883,000 | 10/1932 | Senft | 152/243 |
| 1,434,052 | 10/1922 | English | 152/239 |

Primary Examiner—James B. Marbert

[57] ABSTRACT

This product is a traction assembly designed primarily for heavy-duty vehicles, and comprises a chain assembly of unidirectionally distorted links in combination with rings connecting the same, and side chains holding the assembly securely upon the vehicle tire; the links of the traction portion having projecting lugs upon the outward face thereof, wherein the interaction of the rings and chains maintains the assembly in position for maximum contact of the lugs with the surface of the terrain.

10 Claims, 11 Drawing Figures

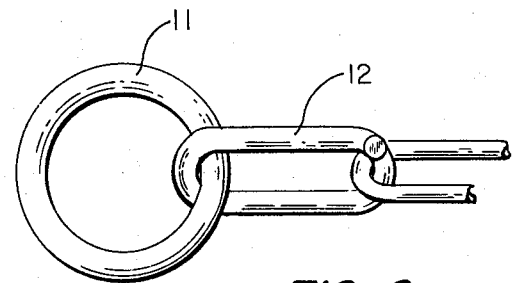
FIG. 6
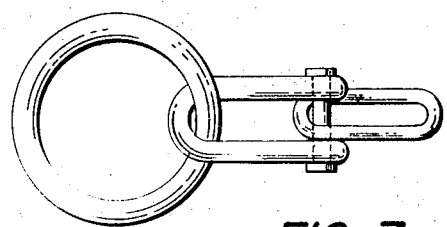
FIG. 7
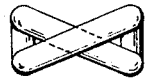   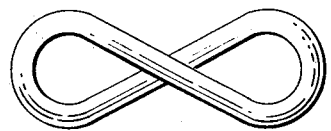
FIG. 8            FIG. 9

SELF-ALIGNING TRACTION ASSEMBLY FOR VEHICLES

The present invention has for its purpose the provision of a traction assembly for use on the wheels of heavy-duty self-powered vehicles such as tractors, skidders and trucks. The wheels of such vehicles usually are equipped with inflated rubber tires, and despite massive cleats formed integrally with the tires, it is difficult to maintain traction on slippery terrain or in deep mud or snow.

One of the necessary elements of a traction assembly is an open structure and a measure of flexibility so that mud or snow cannot become lodged and frozen among the members and thus defeat the purpose of the assembly. This is a constant hazard when the equipment is employed in logging operations in areas where temperatures remain below zero for long periods of time and frozen masses lodged in the tire chains are difficult to dislodge.

Another important feature is a structure which may be fitted over the contour of a tire, widening laterally upon the central portion of the tread and being tightenable along the side portions.

In addition to providing these features, the product of this invention avoids the disadvantages of many such devices appearing in the prior art and in the industrial market. Included in these disadvantages are the tendency for the chains to rotate and turn the lugs toward the tire tread instead of maintaining the lugs in outwardly directed position. In such cases the lugs, which are larger and longer in chains for heavy-duty vehicles than those used on passenger automobiles, cut into the tire tread and may even penetrate the casing.

It is essential that the traction assembly be so constructed that it does not slip down into the valleys of the tire treads and thereby lose its effectiveness, and the interaction of the rings and connecting chains of this invention prevents any such slippage.

This traction assembly consists of a succession of rings which provide connection means for chain links, the latter being usually in lengths of two or three links, and at least one projecting lug on the outer face of each link. The pattern of the assembly is established by connecting four chains to each ring, and both ends of each length of chain into a ring diagonally disposed from the ring at the opposite end of said length. Thus the chains provide quadrangular patterns covering the tread of the vehicle tire.

In the repetitive pattern of rings and connecting chains employed in this invention, in which each ring has, preferably, four chains interconnected with it, the structure comprises, in lateral placement, a row of rings with the outermost ring on each row being connected to the side chains, and alternating therewith, a row of rings being one less in number than the first said row of rings. Thus placed, the rings necessitate diagonal directions for the chains connected therebetween.

For purposes of stability of the assembly upon the tire, and in order to assure maximum effectiveness of the projecting lugs, the links of the chain of this invention are distorted out of plane, so that each link connected to a ring permits the ring to lie flat, and the adjacent links cause the chain to be disposed smoothly upon the tire tread. The lugs are disposed upon the uppermost point of each link as the same rests upon the tire surface. Distortion of the links may be either sinistral or dextral, but all links of chain in an assembly are subjected to the same distortion.

Each link has upon the portions which are outermost from the vehicle tread, lugs projecting perpendicularly from such outermost parts, said lugs being thus diagonally disposed upon said link. When the chains are connected to the rings, the lug-bearing part of the link interconnected to the ring is so disposed that the lug makes maximum contact with the surface of the terrain. This is because the pressure of the tire upon the ring, and the force of the ring exerted upon the end of the link, cause the full weight of the vehicle to be imposed upon these lugs as the same come into contact with the surface of the terrain. The lug on the diagonally opposite portion of the link augments the grip exerted by the lug on the end of the link contiguous to the ring.

The assembly is mounted upon the vehicle tire and held in position by side chains connected to the outermost rings along the sides of the assembly. The rings that are outermost in lateral placement are connected together by lengths of non-lugged chain, of like distortion to the lugged links, to permit tightening of the assembly upon the vehicle wheel and to maintain such tightness. The connection may be achieved by welding, for integral attachment, or by use of a detachable connector such as a shackle or other type of cold assembly device.

In a modification of this invention there is provided a comparatively low-cost assembly wherein lugged chain links provide effective traction and rings in combination with said chains give sturdy yet flexible support for the arrangement of the assembly upon the tread portion of a vehicle tire.

Such an assembly requires a close fit upon the tire, and this is provided by side chains of conventional type, drawing the side arm members of the assembly into diagonal arrangement to retain the traction chains, having lugs, and their connecting rings in a substantially square pattern.

The lugs are maintained in projecting position by the longitudinal distortion of the links, causing the lugs to be outwardly disposed and maintained in such position when the assembly is drawn taut upon the vehicle tire. Only the links which are interconnected with the rings are provided with lugs. Preferably, each chain consists of three links, the end links having lugs and the center link being without lugs. The reason for omission of lugs on the center link is that the link does not always rest upon a part of the tire tread, but may be disposed over a valley between the tire cleats, thus giving no support for the link and, consequently, making lugs ineffective. The end links, on the contrary, being interconnected with rings, have sufficient support whether they are resting on tire cleats or in valleys therebetween.

The side arm members, each of which is interconnected with a ring at the corner of a square in the structure, are drawn diagonally so that side arms from adjacent squares are connected to the side chains at substantially the same point. This connection point may be an enlarged chain link, a ring, or a cold-assembly connector device of any preferred type.

In use, the rings lie flat upon the uppermost portion of the tire tread, forcing the lugs in the interconnected links to project outwardly from the tire surface. This serves the dual purpose of greatly increased traction and prevention of turning of the links so that the lugs cannot turn inwardly and tear the tire cleats or perforate the tire.

For a better understanding of the invention, reference is made to the accompanying drawings, wherein FIG. 1 is a perspective view of a portion of a traction assembly mounted on a vehicle wheel;

FIG. 6 shows a detail of a side chain integrally connected to a ring;

FIG. 7 shows a detail of a side chain connected to a ring by means of a detachable connector device;

FIG. 8 shows an end elevation of a link of the side chain;

FIG. 9 shows a side elevation of the link of FIG. 7;

Figure 1:
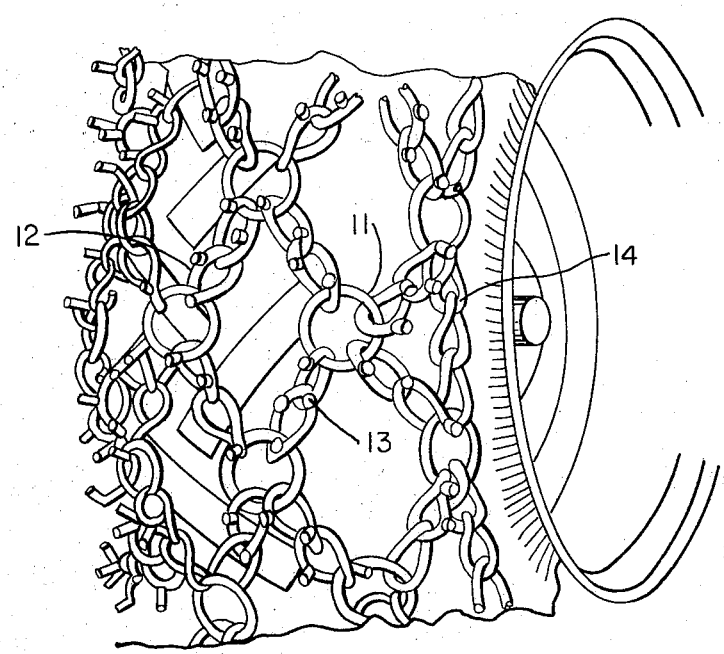

Referring more particularly to the drawings:

The assembly in FIG. 1 comprises rings 11, chain links 12, each with lugs 13, and side chains 14 holding the assembly on the tire.

Figure 2:
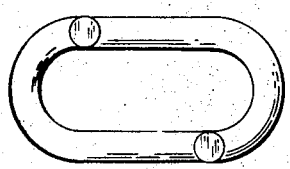
FIG. 2 is a top plan view of a link used in the structure.
Figure 3:
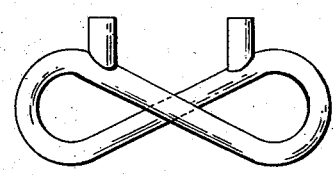
FIG. 3 is a side elevation of the link of FIG. 2.
Figure 4:
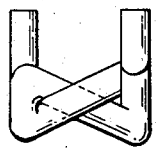
FIG. 4 is an end elevation of the link of FIG. 2.

In the views of FIGS. 2, 3 and 4, link 12 is shown, the lugs being disposed diagonally on the face of the link, and the sinistral distortion being clearly discernible in FIGS. 3 and 4.

Figure 5:
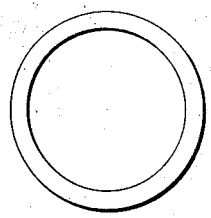
FIG. 5 is a ring employed for connecting the chain lengths.

The ring 11 in FIGS. 5 and 6 is a conventional ring made of bar stock of such size as to sustain the tension of the four diversely disposed chains. It will be seen that one of the projecting lugs 13 on the chain link 12 which is connected to the ring is so disposed that it is directly above the ring, thus providing emphasized traction by reason of the pressure of the tire upon the ring, the pressure of the ring upon the end of the chain link, and the projection of the lug from the chain link so that the lug digs into the terrain.

In the view of FIG. 7, there is shown a detachable connector of the shackle type, which may be optionally employed to connect the side chain to the ring.

The views of FIGS. 8 and 9 show the links of the side chain, which is non-lugged.

Figure 10:
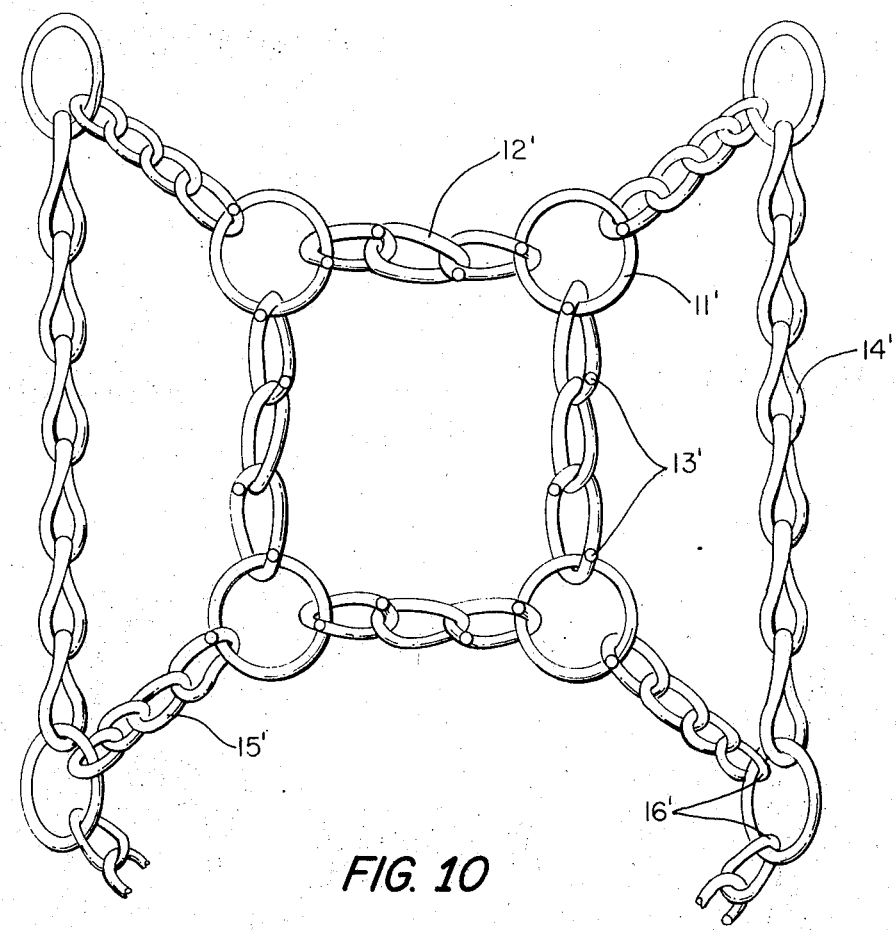
FIG. 10 is a perspective view of a portion of the low-cost assembly having the chains forming squares as they are interconnected with rings.

In FIG. 10, the low-cost version of this invention is shown with rings 11', chain links 12' connected thereto, with lugs 13' on the links interconnected with said rings; and side chains 14' holding the assembly on the tire.

Figure 11:
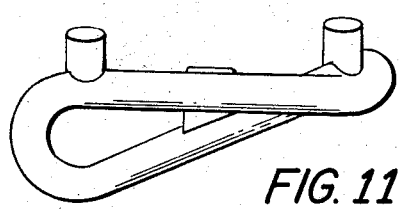
FIG. 11 is a perspective view of a center link of the chain interconnecting two rings of the structure of FIG. 10, showing a cross-bar integrally attached at its opposite ends to the side rails of the link.

FIG. 11 shows a center link 15 of one of the connecting chains, with a protective member 16 integrally and transversely attached on the outer face of the link. Such member may be made from a piece of conventional bar stock, flattened at both ends 17, 17 to fit the slant of the opposing side rails 18, 18.

The said protective member serves to prevent undue wear on the chain links and, particularly, protects the tire tread from wear by providing added distance between the tire and the ground.

The invention having been thus disclosed, what is claimed is:

1. In a traction assembly for mounting upon the tire of a self-powered vehicle, a succession of rings connected together by lengths of chain having links unidirectionally distorted in the longitudinal plane thereof; said lengths of chain being so connected as to form a succession of polygonal patterns across the width of the tire, in such manner that tension exerted upon any part of such assembly creates reacting tension upon the remainder thereof, said assembly being susceptible of expansion either laterally or linearly and thus effecting a snug emplacement of said assembly upon the said vehicle tire.

2. The invention of claim 1 wherein each link of said chain has integrally connected upon the surface thereof distantmost from the tread of said tire, at least one projecting lug extending perpendicularly from the plane of said link and said tire tread.

3. The invention of claim 2 wherein each link thus distorted to provide diagonally disposed elevated segments thereof, is provided with a lug on each of said diagonally disposed elevated segments.

4. A flexible traction assembly, expansible in either lateral or linear direction and adapted to be mounted upon the tire of a vehicle, comprising lug-bearing chain links interconnected between rings, said chains defining a succession of polygonal patterns across the width of the tire, and the outermost ring on each side of said assembly being connected by non-lugged chains of like distortion constituting side chains for the secure retention of said assembly upon said tire.

5. The invention of claim 2 wherein each link interconnected with a ring is so disposed that the lug on the end thereof contiguous to said ring is directly above the portion of said link so interconnected, thus combining the traction effects of the weight of said vehicle wheel on said ring, and the pressure of said ring on the end of said link.

6. The invention of claim 2 wherein the lugged chains interconnected with the rings outermost on the sides of the assembly interact with non-lugged chains constituting the side chains, creating a linear pull on said ring by said side chains and counterbalancing opposed diagonal pulls by said lugged chains on said ring.

7. The invention of claim 2 wherein the rings, resting upon the outermost portions of the tire cleats, maintain the interconnecting chains in a plane above said cleats, thereby preventing said chains from slipping into the valleys between said cleats, to assure full traction effectiveness of all parts of the assembly.

8. The invention of claim 5 wherein each end link of said chains has at least one lug projecting from the plane of said link, and the intermediate links of said chains are without lugs.

9. The invention of claim 1 wherein the center link of each piece of chain is provided with a protective member thereacross, to increase the distance between the tire and the ground, thus protecting said tire from excessive wear.

10. The invention of claim 9 wherein said protective member is made of bar stock and the ends thereof are flattened to conform to the slant of the side rails of said center link, at the points of attachment.

* * * * *